United States Patent
Ohmori et al.

[11] Patent Number: 6,052,573
[45] Date of Patent: Apr. 18, 2000

[54] FIXED SUBSCRIBER UNIT OF WIRELESS LOCAL LOOP SYSTEM

[75] Inventors: Tadashi Ohmori, Tokyo; Tsutomu Takahashi, Kanagawa, both of Japan

[73] Assignee: Matsushita Electric Industrial Co., Ltd., Osaka, Japan

[21] Appl. No.: 09/072,894

[22] Filed: May 5, 1998

[30] Foreign Application Priority Data

May 23, 1997 [JP] Japan .................................. 9-148440

[51] Int. Cl.⁷ .................................................. H04M 9/00
[52] U.S. Cl. ........................ 455/401; 455/555; 379/418; 379/424
[58] Field of Search ................................... 455/11.1, 401, 455/462, 465, 555, 561, 74.1, 425; 379/418, 424, 448, 382, 385, 378, 355; 375/343

[56] References Cited

U.S. PATENT DOCUMENTS

| | | | |
|---|---|---|---|
| 4,300,021 | 11/1981 | Van Husen | 379/378 |
| 4,555,593 | 11/1985 | O'Dea | 379/385 |
| 5,402,482 | 3/1995 | Minohara et al. | 379/382 |
| 5,680,449 | 10/1997 | Terajima et al. | 379/355 |
| 5,689,557 | 11/1997 | Kaplan | 379/355 |
| 5,819,177 | 10/1998 | Vucetic et al. | 455/425 |
| 5,884,148 | 3/1999 | Bilgic et al. | 455/74.1 |
| 5,909,471 | 6/1999 | Yun | 375/343 |

FOREIGN PATENT DOCUMENTS 5292212 of 0000 Japan .
6-6572 1/1994 Japan .

*Primary Examiner*—Dwayne D. Bost
*Assistant Examiner*—Quochien B. Vuong
*Attorney, Agent, or Firm*—Pearne, Gordon, McCoy & Granger LLP

[57] ABSTRACT

An off-hook/on-hook signal discriminating means 5a is provided in a control portion 5 of the FSU in order to make discrimination between a pulse dial signal and a hooking signal. When a telephone turns to an off-hook state after an on-hook state and turns to an on-hook state again and the on-hook state is continued for a predetermined time, the FSU performs a terminating process so as to be returned into a standby state. When an off-hook signal is detected again in a time smaller than a predetermined time, the FSU recognizes that the signal is either a dial pulse signal or a hooking signal, and the off-hook/on-hook signal discriminating means 5a monitors the time required for detecting an on-hook signal again. When the time required for detecting an on-hook signal again is smaller than the predetermined time, the FSU decides that the signal is a dial pulse signal, and controls a tone generating circuit 7f to stop the dial tone. When there is no on-hook signal detected even though the predetermined time is passed, the FSU decides that the signal is a hooking signal, and controls the tone generating circuit 7f to stop the dial tone. Because a pulse dial signal and a hooking signal are discriminated from each other, dialing and hooking can be used differently in the same operation as an ordinary telephone connected to a wire telephone line.

8 Claims, 14 Drawing Sheets

FIG. 11

BURST CONFIGURATION OF LCCH TRANSMITTED BY PHS BASE STATION

| PR | UW | BASE STATION ID | CONTROL INFORMATION | CRC |
|----|----|----|----|----|

FIXED SUBSCRIBER UNIT OF WIRELESS LOCAL LOOP SYSTEM

BACKGROUND OF THE INVENTION

The present invention relates to a telephone communication apparatus, and particularly to a fixed subscriber unit for use in a wireless local loop type telephone system.

Recently, a communication method called wireless local loop (hereinafter referred to as WLL) in which a telephone can be used in a general home or business office by wireless, instead of metal wire, in a place where no wire telephone line network is laid has been widely noticed. In the WLL, a wireless base station is set in (or near) a telephone central office so that the wireless base station is connected to the telephone central office by a wire (or wireless) line. Further, a fixed subscriber unit (hereinafter referred to as FSU) is set in a general home or in a business office so that a telephone can be connected to the FSU. The wireless base station and the FSU can be communicated with each other by wireless so that a telephone can be used in a general home or in a business office.

FIG. 9 shows an example of the overall configuration of the WLL. Here is shown an example of the configuration of a WLL system in a general home. In FIG. 9, the reference character A designates a house of a general home; B, an FSU set in the general home; C, a telephone connected to the FSU through a telephone cord; and D, an FSU antenna generally set outside the house. Further, the reference character E designates a wireless base station which performs communication with the FSU by wireless. In the example of FIG. 9, the wireless base station is set outside a telephone central office. The reference character F designates an antenna of the wireless base station; and G, a pillar on which the wireless base station E and the antenna F are set. The wireless base station E is connected to an office equipment I in a telephone central office H through a wire cable. The reference character J designates the whole of a higher-rank network of the telephone central office as a whole.

FIG. 10 shows the internal configuration of the FSU. In FIG. 10, the reference numeral 1001 designates an antenna connector. Because an antenna of the FSU is generally set outdoors, the antenna connector 1001 serves a connector for connecting a cable of the antenna. The reference numeral 1002 designates a wireless circuit. The wireless circuit 1002 performs transmission/reception of wireless data while the frequency and the transmission timing are designated by a wireless control portion 1003. The reference numeral 1002a designates a synthesizer built in the wireless circuit 1002. The synthesizer 1002a generates a signal of the frequency designated by the wireless control portion 1003. The wireless control portion 1003 measures the level of reception on the basis of the wireless data received from the base station and then writes reception level data in a temporary storage memory in a control portion 1005. The reference numeral 1004 designates a channel codec portion for coupling/decoupling data transmitted/received through a wireless control channel and a communication channel. A data in a communication channel is composed of information such as voice data, or the like, and control information to be processed by the control portion 1005. The user data such as voice data, or the like, is signal-processed by voice codec in a telephone line interface portion 1007 without any interposition of the control portion 1005. The reference numeral 1006 designates a memory for storing information necessary for grasping an operating base station, or the like. A non-volatile memory is often used as the memory. The reference numeral 1007 designates a telephone line interface portion which includes a voice codec portion 1007a, a telephone line circuit 1007b, a reception signal generating circuit 1007c, a telephone off-hook/on-hook detecting circuit 1007d, a telephone dial detecting circuit 1007e, and a tone generating circuit 1007f for outputting a dial tone, a busy tone, a howler tone, or the like, to a telephone. The reference numeral 1008 designates a telephone cord connector for connecting a telephone cord of the telephone connected to the FSU; 1009, an electric source circuit; and 1010, an electric source cord of a direct connection type or a separation type.

The manner how to make transmission, reception and speech by using a general home telephone in the WLL system will be described briefly below with reference to FIGS. 9 and 10 by way of example in the case where the WLL employing a TDMA/TDD (time division multiple access/time division duplexing) personal handy phone (PHS).

In FIG. 9, when the wireless base station E is on standby for communication, in the same manner as a general PHS public base station, the wireless base station E transmits information signals called LCCH (logical control channel) at regular periods to a counter station (CS), that is, to a portable station (PS) in the case of a general PHS system, while to the FSU in the case of a WLL system.

In FIG. 10, after the FSU is powered on, that is, after a power plug of the electric power cord 1010 is inserted into plug socket so that the electric source circuit 1009 supplies an electric source to respective parts, the FSU receives the LCCH of a wireless base station identified by the wireless base station information registered in the memory 1006 of the FSU. Here, the wireless base station information registered in the FSU contains the carrier (frequency) number (commonly called control carrier number) of the LCCH transmitted by the wireless base station, and the system identification code (commonly called system ID) of the wireless base station. That is, after the FSU is powered on, the FSU makes the control portion 1005 control the wireless control portion 1003 to set a frequency in the synthesizer 1002a so as to correspond to the control carrier number on the basis of the information registered in the memory 1006 in the FSU, and further makes the control portion 1005 control the wireless circuit 1002, through the channel codec portion 1004, so as to be in a continuous reception state in order to search for the LCCH of a wireless base station coincident with the system ID registered in the memory 1006.

FIG. 11 shows the burst configuration of the LCCH used in a control carrier of a PHS defined in RCR STD-28 which is a standard specification of the PHS. In FIG. 11, the reference character PR designates a preamble portion, and the reference character UW designates a unique word for synchronization. The unique word UW is followed by base station ID (42 bits) of a wireless base station which is a counter station of the FSU. The data of upper 9 bits in the 42 bits of the base station ID corresponds to the system ID. The base station ID is followed by control information and CRC information.

FIG. 12 is a schematic diagram of a position registration sequence defined in RCR STD-28. If the upper 9-bit data (namely, the system ID) of the base station ID in the LCCH coincides with the system ID registered in the memory 1008 in the FSU when the FSU searches for the LCCH of the wireless base station, the control portion 1005 controls the channel codec portion 1004 to grasp the wireless base station, after the FSU performs data exchange, through wireless line, of the position registration sequence defined in RCR-STD-28, under the control by the control portion 1005 and the channel codec portion 1004, the FSU gets in a standby state in the same manner as the mobile station of a general PHS. By the position registration, the position information of the FSU is sent from the base station to the telephone central office, so that the FSU can receive signals.

The transmitting operation of the FSU will be described below. FIG. 13 is a schematic diagram of a telephone-FSU-base station transmission sequence based on a batch transmission sequence diagram defined in RCR STD-28. When a telephone C connected to the FSU is hooked off and sends out a specific dial after the position registration, the control portion 1005 makes the telephone off-hook/on-hook detecting circuit 1007d of the telephone line interface portion 1007 of FIG. 10 detect an off-hook signal from the telephone C. Upon detection of the off-hook signal, the control portion 1005 makes the tone generating circuit 1007e of the telephone line interface portion 1007 output a dial tone to the telephone C.

Hearing the dial tone, the user pushes down the dial of the telephone. In the FSU, the control portion 1005 controls the telephone dial detecting circuit 1007e of the telephone line interface portion 1007 to detect the dial from the telephone C. The control portion 1005 sets a predetermined waiting time in a dial input waiting timer. When the timer expires, data exchange in the batch transmission sequence defined in RCR STD-28 is performed on wireless line by means of the control portion 1005 and the channel codec portion 1004. When communication connection succeeds, the control portion 1005 operates the voice codec portion 1007a of the telephone line interface portion 1007, so that the user can hear, through the telephone, a ringback tone (hereinafter referred to as RBT) which is a sound outputted from the telephone central office to call a remote-side telephone through the base station and the FSU. The user waits for the response of the remote-side telephone so that the user can make speech with the remote-side telephone through the telephone C when the remote-side telephone makes a response.

FIG. 14 is a schematic diagram of a telephone-FSU-base station reception and reception response sequence based on a reception sequence diagram defined in RCR STD-28. When there is a reception from the remote-side telephone, first, communication based on the reception sequence defined in RCR STD-28 is performed between the wireless base station E and the FSU by means of the control portion 1005 and channel codec portion 1004 in the FSU. When the reception sequence succeeds, the FSU makes the control portion 1005 control the reception signal generating circuit 1007c of the telephone line interface portion 1007 to send out a reception signal to the telephone C, so that a ringer sound is generated from the telephone C to inform the telephone user of the reception. When the user hooks off the telephone in the reception state, the control portion 1005 of the FSU controls the telephone off-hook/on-hook detecting circuit 1007d of the telephone line interface portion 1007 to detect the off-hook signal from the telephone C. The control portion 1005 controls the channel codec portion 1004 and the wireless circuit 1001 to transmit a response message to the wireless base station E by wireless. When the FSU receives a response confirmation message from the wireless base station E, the reception response is established so that the user can make a speech with the user of the remote-side telephone through the telephone C.

In the telephone line interface portion in the aforementioned conventional WLL fixed subscriber unit, the telephone off-hook/on-hook detecting circuit and the telephone dial detecting circuit are provided separately from each other. Accordingly, if the control portion is achieved on the consideration that all standards of pulse dials in telephones used in various countries in the world are satisfied, that is, if the control portion is configured so that a DTMF (dual tone multi-frequency) type telephone dial is detected by the telephone dial detecting circuit and that a pulse dial type telephone dial is detected by the off-hook/on-hook detecting circuit, there arises a problem that the telephone pulse dial signal may be detected so as to be mistaken for a hooking signal.

SUMMARY OF THE INVENTION

The present invention is designed to solve the aforementioned problem in the prior art. A first object of the present invention is to provide a fixed subscriber unit of a wireless local loop system which is excellent in discrimination between a pulse dial signal and a hooking signal from a telephone.

A second object of the present invention is to provide a fixed subscriber unit of a wireless local loop system which is excellent in that a telephone user is urged to retry to dial from the beginning by a dial tone output when a hooking signal is inputted in the middle of dialing, on the consideration that the user retry to dial for the reason of dialing error, or the like.

A third object of the present invention is to provide a fixed subscriber unit of a wireless local loop system which is excellent in that a dial tone is outputted to rapidly inform a user that a telephone returns into a dial input waiting state in the case where a hooking signal is detected when the telephone is hooked off for a long time carelessly so that a busy tone or a howler tone is outputted.

A fourth object of the present invention is to provide a fixed subscriber unit of a wireless local loop system which is excellent in that each of pulse dial signals of from "0" to "9" is converted into one hooking signal to prevent any unnecessary hooking signal from being transmitted to the base station in the case where the pulse dial signal is generated by operation mistake in the middle of speech.

In order to achieve the aforementioned first object, the fixed subscriber unit according to the present invention comprises a telephone line interface portion including a telephone off-hook/on-hook detecting circuit, a telephone dial detecting circuit, and a tone generating circuit, and an off-hook/on-hook signal discriminating means including a guard timer for making discrimination between a hooking signal and a pulse dial signal.

In order to achieve the aforementioned second object, the fixed subscriber unit according to the present invention comprises a dial initializing means for controlling the tone generating circuit to generate a dial tone to make it possible to input the dial of the telephone from the beginning again upon detection of the hooking signal detected in the middle of detection of the dial signal.

In order to achieve the aforementioned third object, the fixed subscriber unit according to the present invention comprises: a dial detection timer for performing dial detection for a predetermined time when dial has not been inputted yet after off-hook; a busy tone output control means for controlling the tone generating circuit to output a busy tone to the telephone when the dial detection timer expires; a busy tone output continuation timer; a howler tone output control means for controlling the tone generating circuit to output a howler tone to the telephone when the busy tone output continuation timer expires because the telephone is kept out of the off-hook state even though the busy tone is outputted; and a second dial initializing means provided separately from the dial initializing means which is detecting the dial for controlling the tone generating circuit to stop the busy tone or the howler tone and generate a dial tone in the case where the pulse dial signal and the hooking signal are detected from the telephone when the hooking signal is generated from the telephone in the middle of the busy tone or howler tone output by the busy tone output control means or the howler tone output control means.

In order to achieve the aforementioned fourth object, the fixed subscriber unit according to the present invention comprises a hooking signal conversion means for converting each of pulse dial signals of from "0" to "9" into one hooking signal upon detection of the pulse dial signal in a speech state.

Hence, according to the present invention, when the fixed subscriber unit detects a hooking signal in the middle of dialing, in the middle of busy tone output or in the middle of howler tone output while discrimination is made between a dial signal and a hooking signal issued from the telephone connected to the fixed subscriber unit, a dial tone is outputted to the telephone to return the telephone into a transmission standby state. Accordingly, the user can use the dial and the hooking differently in the same operation as that in a general telephone connected to a wire telephone line without consciousness of the WLL system.

Furthermore, though configuration is made so that the hooking signal is detected easily in the middle of speech, all pulse dial signals are not converted into hooking signals but each of the pulse dial signals of from "0" to "9" is converted into one hooking signal to extremely prevent any unnecessary hooking signal from being transmitted to the base station even in the case where the user using the pulse dial type telephone pushes down the dial by operation mistake in the middle of speech.

BRIEF DESCRIPTION OF THE DRAWINGS

FIG. 11 is a burst configuration diagram of an LCCH (control channel) transmitted by a base station of a wireless local loop system employing a personal handy phone system;

DETAILED DESCRIPTION OF THE PREFERRED EMBODIMENTS

Embodiments of the present invention will be described below with reference to the drawings.

First Embodiment

A first embodiment of the present invention concerns a fixed subscriber unit provided with an off-hook/on-hook signal discriminating means.

Figure 1:
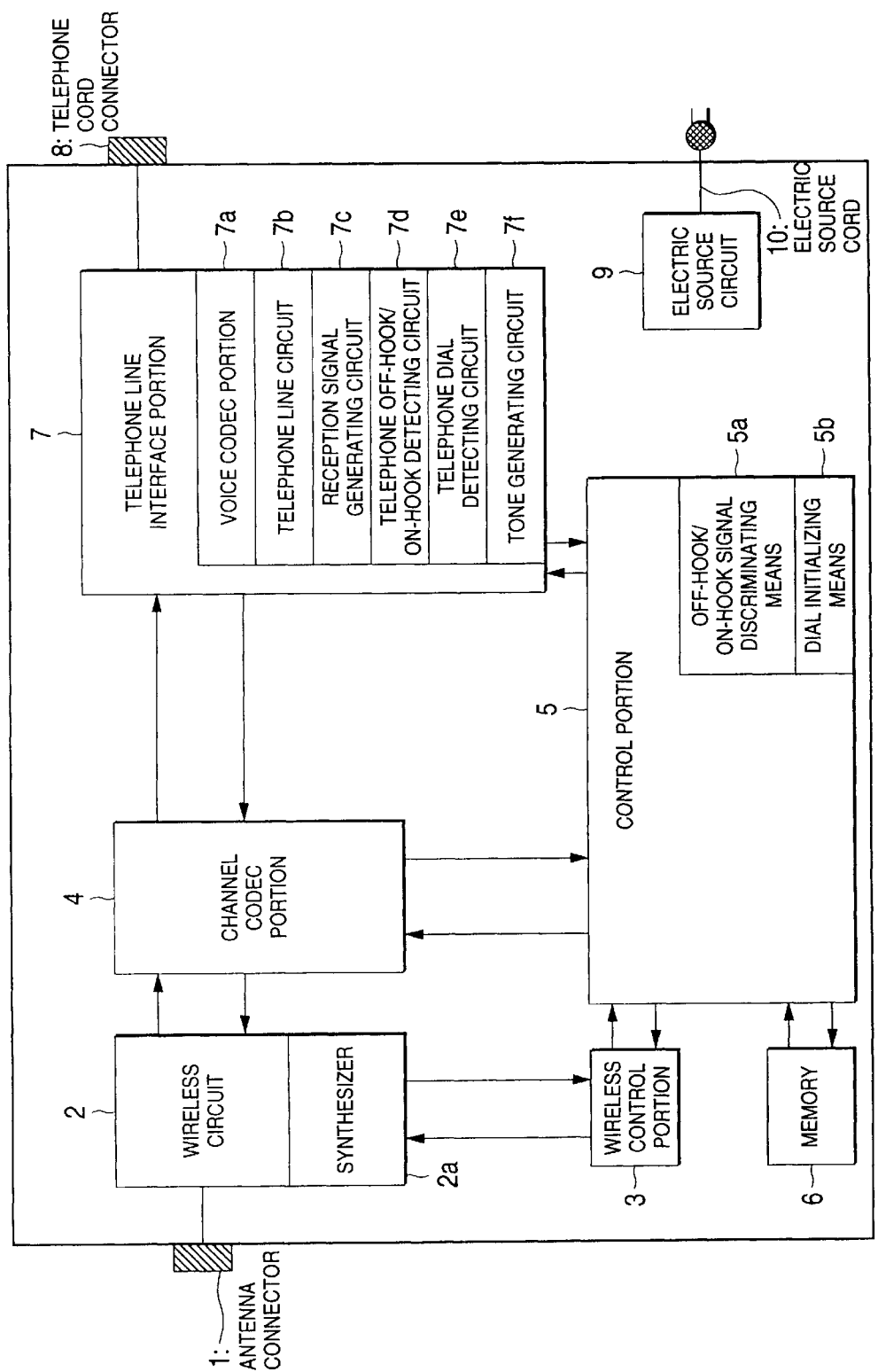
FIG. 1 is a schematic block diagram of a fixed subscriber unit according to a first embodiment of the present invention.

FIG. 1 is a block diagram showing the configuration of the fixed subscriber unit (FSU) according to the first embodiment of the present invention. In FIG. 1, the reference numeral 1 designates an antenna connector. Because an antenna of the FSU is generally set outdoors, the antenna connector 1 is a connector for connecting a cable of the antenna. The reference numeral 2 designates a wireless circuit. The wireless circuit 2 transmits/receives wireless data while the frequency and the transmission/reception timing are designated by a wireless control portion 3. The reference numeral 2a designates a synthesizer built in the wireless circuit 2. The synthesizer 2a generates a signal of the frequency designated by the wireless control portion 3. The wireless control portion 3 measures the level of reception on the basis of the wireless data received from the base station and then writes reception level data in a temporary storage memory in a control portion 5. The reference numeral 4 designates a channel codec portion for coupling/decoupling data transmitted/received through a wireless control channel and a communication channel. A data in a communication channel is composed of information such as voice data, or the like, and control information to be processed by the control portion 5. The user data such as voice data, or the like, is signal-processed by voice codec in a telephone line interface portion 7 without any interposition of the control portion 5. The reference numeral 5a designates an off-hook/on-hook signal discriminating means which contains a guard timer for making discrimination between a pulse dial signal and a hooking signal. The reference numeral 5b designates a dial initializing means. The reference numeral 6 designates a memory. The reference numeral 7 designates a telephone line interface portion; 7a, a voice codec portion; 7b, a telephone line circuit; 7c, a reception signal generating circuit; 7d, a telephone off-hook/on-hook detecting circuit; 7e, a telephone dial detecting circuit; and 7f, a tone generating circuit. The reference numeral 8 designates a telephone cord connector for connecting a telephone cord of the telephone connected to the FSU; 9, an electric source circuit; and 10, an electric source cord.

Figure 2:
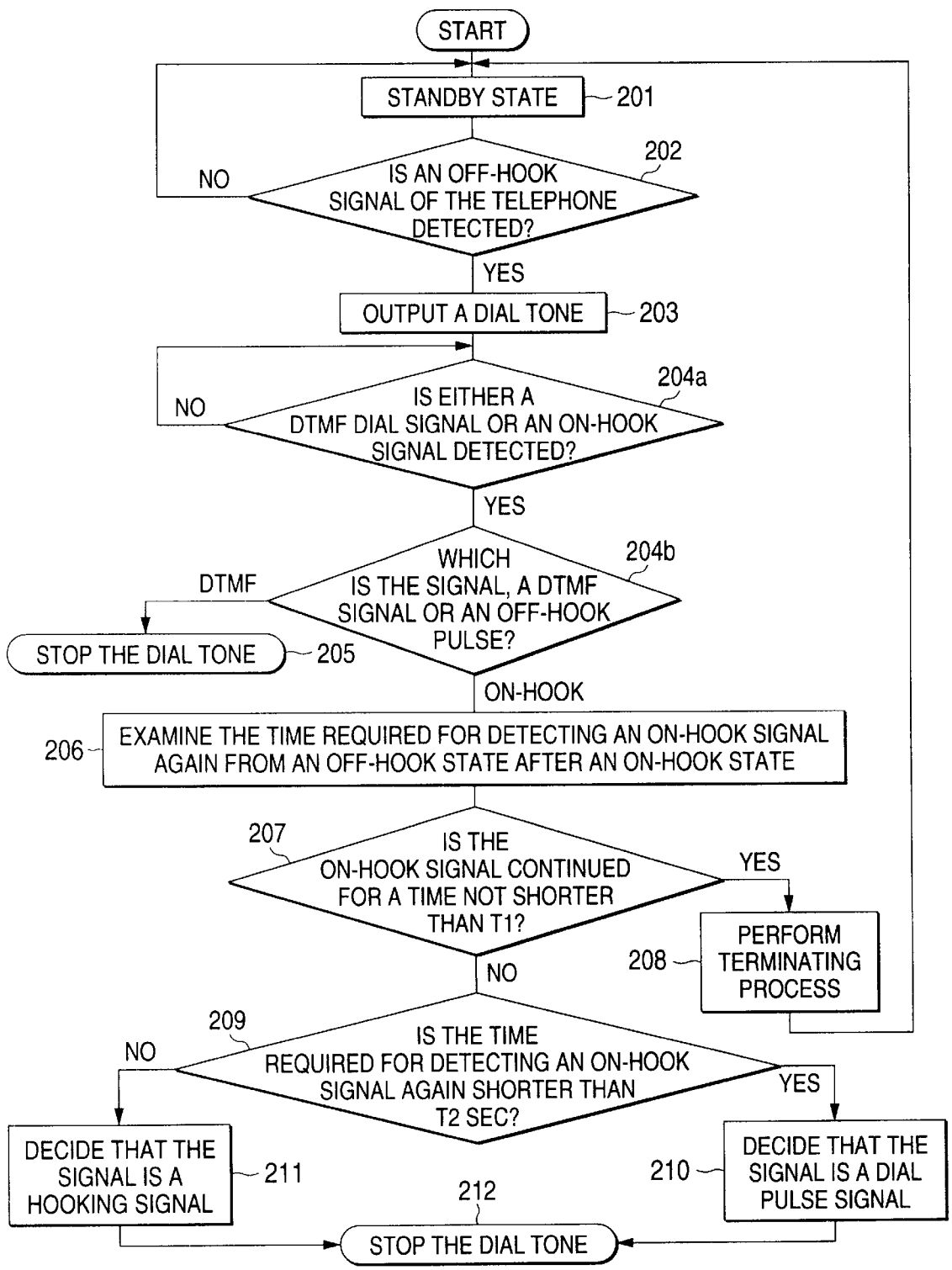
FIG. 2 is a flow chart for explaining the operation of the FSU according to the first embodiment of the present invention.

FIG. 2 is a flow chart for explaining the operation for making discrimination between a pulse dial signal and a hooking signal from the telephone in the FSU according to the first embodiment of the present invention. The control portion 5 of the FSU depicted in FIG. 1 performs the control shown in this flow chart. The operation will be described with reference to this flow chart of FIG. 2 and the circuit diagram of FIG. 1. After the FSU has already grasped a specific base station and has performed position registration for the base station, the FSU gets in a standby state. The operation of the FSU before the standby state will be omitted.

In the standby state (step 201), when the off-hook state of the telephone connected to the FSU is detected by the telephone off-hook/on-hook detecting circuit 7d of the telephone line interface portion 7 in the FSU and the continuation of the off-hook state for a predetermined time is detected by the off-hook/on-hook signal discriminating means 5a of the control portion 5 in the FSU, a decision is made so that the telephone is in an off-hook state. The control portion 5 controls the tone generating circuit 7f to generate a dial tone to the telephone (step 203).

After the dial tone is sent out, the FSU gets in a state in which the FSU waits for a DTMF dial or on-hook signal from the telephone (step 204a). The pulse dial signal and the actual on-hook signal cannot be discriminated from each other at this point of time. If the user performs dialing by using a DTMF dial type telephone, a DTMF signal is detected by the telephone dial detecting circuit 7e of the telephone line interface portion 7 in the FSU (step 204b). Accordingly, a signal corresponding to the DTMF dial is transmitted from the telephone dial detecting circuit 7e to the control portion 5.

Because the dial is inputted, after the content of the DTMF dial is recognized, the tone generating circuit 7f is controlled by the control portion 5 to stop the dial tone output to the telephone (step 205).

When not the DTMF dial but the on-hook pulse is detected by the telephone off-hook/on-hook detecting circuit 7d in the FSU (step 204b), the information about this detection is transmitted to the off-hook/on-hook signal discriminating means 5a of the control portion 5. Accordingly, the off-hook/on-hook signal discriminating means 5a monitors the time in which the on-hook state is continued. When the on-hook state is continued for a predetermined time (T1) or more, the control portion 5 recognizes the on-hook state, that is, the fact that a handset of the telephone is placed in the original position. Accordingly, the FSU performs a terminating process so that the FSU is returned into a standby state (steps 207, 208 and 201).

When the off-hook state is detected again in a time shorter than the predetermined time (T1), the FSU recognizes that the signal is either a dial pulse signal or a hooking signal and makes the off-hook/on-hook signal discriminating means 5a monitor the time required for detecting the on-hook state again (step 209). When the time required for detecting the on-hook state again is shorter than a predetermined time (T2), the FSU decides that the signal is a dial pulse signal and, then controls the tone generating circuit 7f to stop the dial tone (steps 210 and 212). When the on-hook state is not detected even though the predetermined time (T2) is passed, the FSU decides that the signal is not a dial pulse signal but a hooking signal and, then controls the tone generating circuit 7f to stop the dial tone (steps 211 and 212).

By the operation as described above, the FSU can make discrimination among a telephone on-hook signal, a pulse dial signal and a hooking signal after the telephone gets in an off-hook state.

Second Embodiment

A second embodiment concerns a fixed subscriber unit in which stored dial information is cleared up and a dial tone is outputted when a hooking signal is detected in the middle of dialing.

Figure 3:
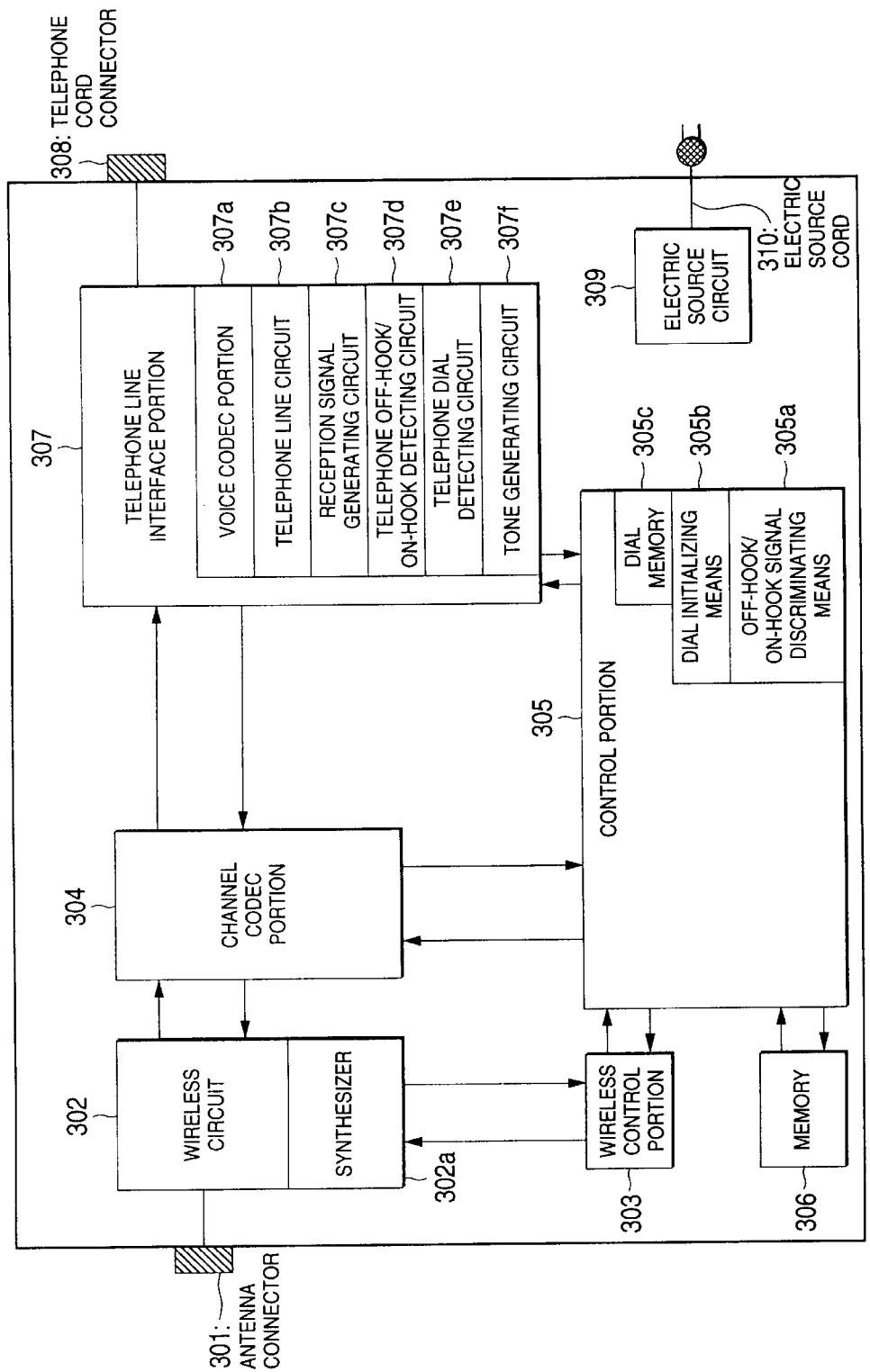
FIG. 3 is a schematic block diagram of the FSU according to a second embodiment of the present invention.

FIG. 3 is a block diagram showing the configuration of the fixed subscriber unit (FSU) according to the second embodiment of the present invention. In FIG. 3, the reference numeral 301 designates an antenna connector. Because an antenna of the FSU is generally set outdoors, the antenna connector 301 is a connector for connecting a cable of the antenna. The reference numeral 302 designates a wireless circuit. The wireless circuit 302 transmits/receives wireless data while the frequency and the transmission/reception timing are designated by a wireless control portion 303. The reference numeral 302a designates a synthesizer built in the wireless circuit 302. The synthesizer 302a generates a signal of the frequency designated by the wireless control portion 303. The wireless control portion 303 measures the level of reception on the basis of the wireless data received from the base station and then writes reception level data in a temporary storage memory in a control portion 305. The reference numeral 304 designates a channel codec portion for coupling/decoupling data transmitted/received through a wireless control channel and a communication channel. A data in a communication channel is composed of information such as voice data, or the like, and control information to be processed by the control portion 305. The user data such as voice data, or the like, is signal-processed by voice codec in a telephone line interface portion without any interposition of the control portion 305. The reference numeral 305a designates an off-hook/on-hook signal discriminating means. The reference numeral 305b designates a dial initializing means. The reference numeral 305c designates a dial memory for storing a dial from the telephone. The reference numeral 306 designates a memory. The reference numeral 307 designates a telephone line interface portion; 307a, a voice codec portion containing a circuit for receiving digital voice data of the channel codec portion 304 and converting the digital voice data into analog voice data to be transmitted to the telephone, and a circuit for receiving analog voice data from the telephone and converting the analog voice data into digital voice data to be transmitted to the channel codec portion 304; 307b, a telephone line circuit; 307c, a reception signal generating circuit; 307d, a telephone off-hook/on-hook detecting circuit; 307e, a telephone dial detecting circuit; and 307f, a tone generating circuit. The reference numeral 308 designates a telephone cord connector for connecting a telephone cord of the telephone connected to the FSU; 309, an electric source circuit; and 310, an electric source cord.

Figure 4:
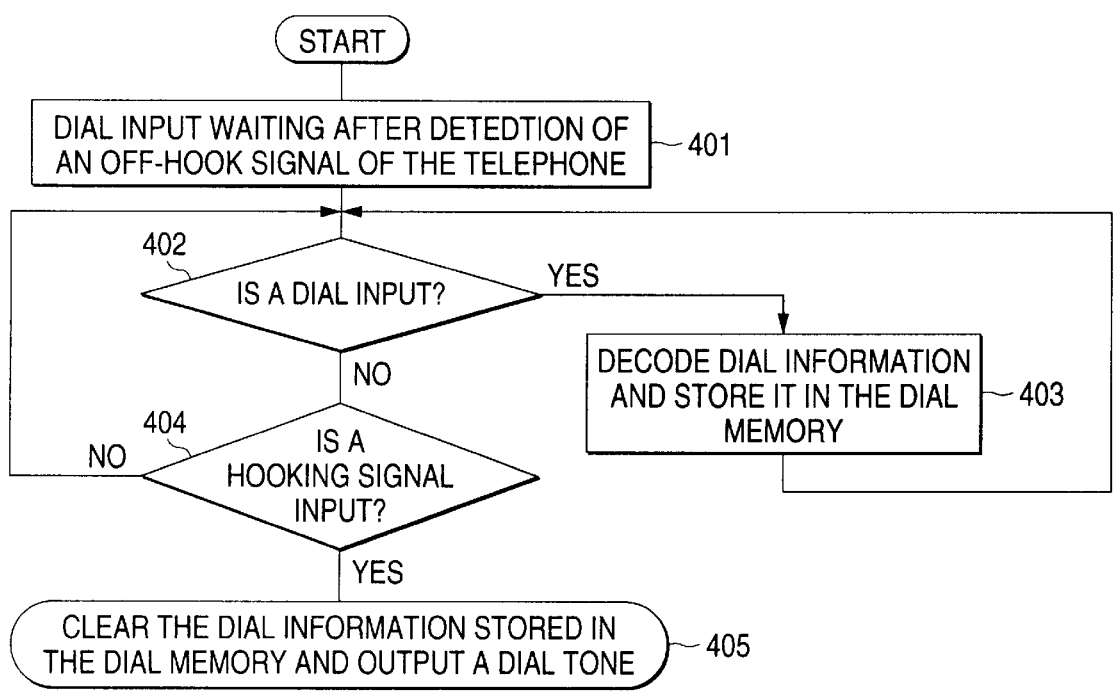
FIG. 4 is a flow chart for explaining the operation of the FSU according to the second embodiment of the present invention.

FIG. 4 is a flow chart for explaining the operation for making discrimination between a pulse dial signal and a hooking signal from the telephone in the FSU according to the second embodiment of the present invention. The control portion 305 of the FSU depicted in FIG. 3 performs the control shown in this flow chart. The operation will be described with reference to this flow chart of FIG. 4 and the circuit diagram of FIG. 3.

After the FSU has already grasped a specific base station and has performed position registration in the base station, the FSU gets in a standby state. When the telephone in the standby state is hooked off, an off-hook state is detected by the off-hook/on-hook signal discriminating means 305a of the control portion 305 on the basis of a signal of the telephone off-hook/on-hook detecting circuit 307d of the telephone line interface portion 307. The control portion 305 controls the tone generating circuit 307f to output a dial tone to the telephone. Accordingly, the telephone gets in a dial input waiting state. The flow chart of FIG. 4 shows the operation after the dial input waiting state.

In the dial input waiting state (step 401), when a pulse dial signal from the telephone connected to the FSU is detected by the off-hook/on-hook signal discriminating means 305a of the control portion 305 in the FSU through the telephone off-hook/on-hook detecting circuit 307d of the telephone line interface portion 307 in the FSU or when a DTMF dial signal from the telephone is detected by the control portion 305 through the telephone dial detecting circuit 307e of the telephone line interface portion 307, the control portion 305 decodes the dial information and stored the decoded dial information in the dial memory 305c of the control portion 305 (steps 402 and 403).

If a hooking signal from the telephone is detected by the off-hook/on-hook discriminating means 305a of the control portion 305 in the FSU through the telephone off-hook/on-hook detecting circuit 307d of the telephone line interface portion 307 ("input" side in step 404), the dial information stored in the dial memory 305c is cleared up by the dial initializing means 305b of the control portion 305 and, then, a dial tone is outputted (step 405).

By the operation as described above, the stored dial information is cleared up and a dial tone is outputted when a hooking signal is detected in the middle of dialing after the off-hook state of the telephone. Accordingly, the FSU can be turned to a dial input waiting state while the wireless circuit is held.

Third Embodiment

A third embodiment of the present invention concerns a fixed subscriber unit in which a dial tone is outputted to turn the telephone to a dial input waiting state when a hooking signal is inputted in the middle of outputting of a busy tone or a howler tone.

Figure 5:
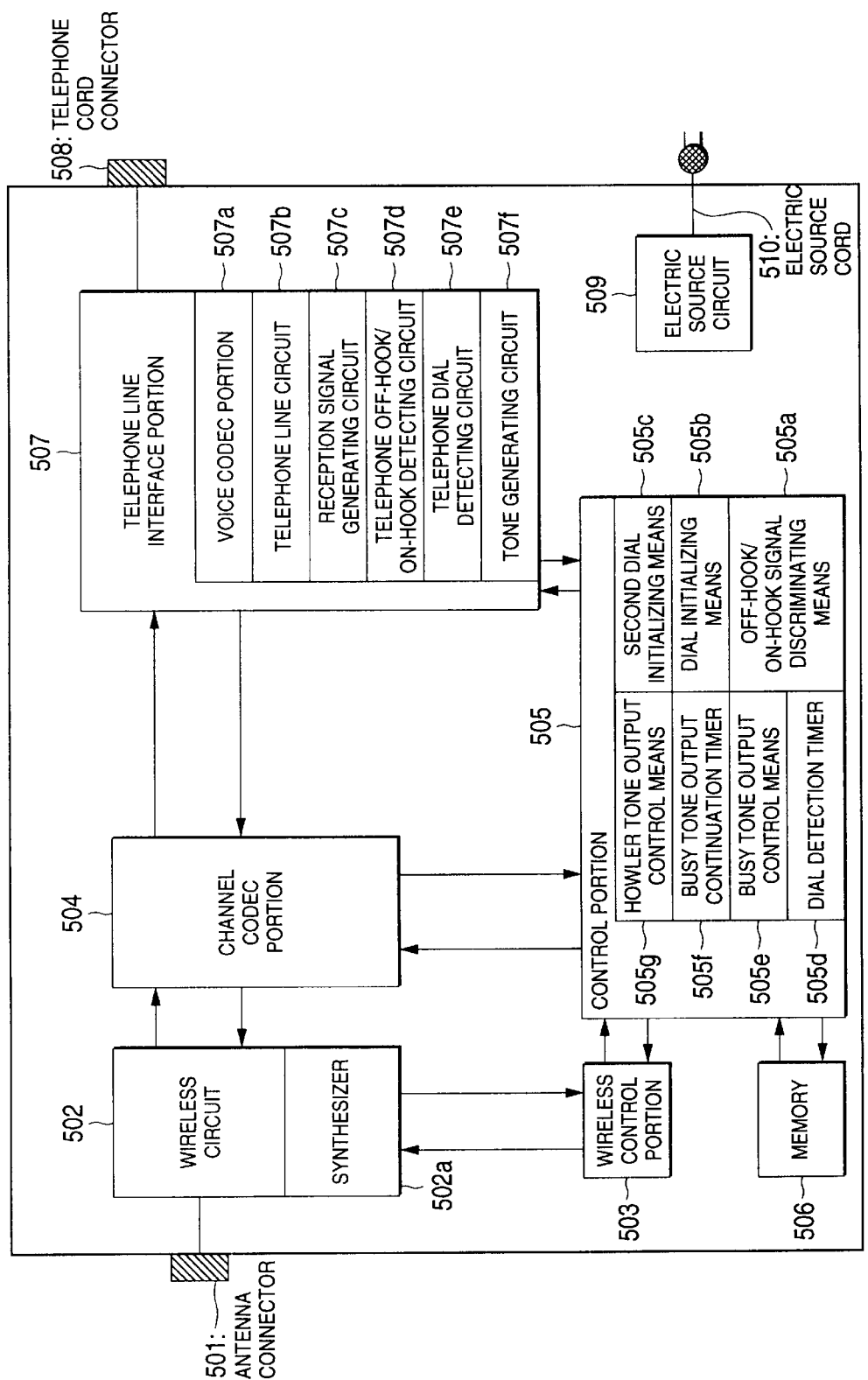
FIG. 5 is a schematic block diagram of the FSU according to a third embodiment of the present invention.

FIG. 5 is a block diagram showing the configuration of the fixed subscriber unit (FSU) according to the third embodiment of the present invention. In FIG. 5, the reference numeral 501 designates an antenna connector. Because an antenna of the FSU is generally set outdoor, the antenna connector 501 is a connector for connecting a cable of the outdoor antenna. The reference numeral 502 designates a wireless circuit. The wireless circuit 502 transmits/receives wireless data while the frequency and the transmission/reception timing are designated by a wireless control portion 503. The reference numeral 502a designates a synthesizer built in the wireless circuit 502. The synthesizer 502a generates a signal of the frequency designated by the wireless control portion 503. The wireless control portion 503 measures the level of reception on the basis of the wireless data received from the base station and then writes reception level data in a temporary storage memory in a control portion 505.

The reference numeral 504 designates a channel codec portion for coupling/decoupling data transmitted/received through a wireless control channel and a communication channel. A data in a communication channel is composed of information such as voice data, or the like, and control information to be processed by the control portion 505. The user data such as voice data, or the like, is signal-processed by voice codec in a telephone line interface portion without any interposition of the control portion 505. The reference numeral 505a designates an off-hook/on-hook signal discriminating means; 505b, a dial initializing means; 505c, a second dial initializing means; 505d, a dial detection timer; 505e, a busy tone output control means; 505f, a busy tone output control timer; and 505g, a howler tone output control means. The reference numeral 506 designates a memory.

The reference numeral 507 designates a telephone line interface portion; 507a, a voice codec portion; 507b, a telephone line circuit; 507c, a reception signal generating circuit; 507d, a telephone off-hook/on-hook detecting circuit; 507e, a telephone dial detecting circuit; and 507f, a tone generating circuit. The reference numeral 508 designates a telephone cord connector for connecting a telephone cord of the telephone connected to the FSU; 509, an electric source circuit; and 510, an electric source cord.

Figure 6:
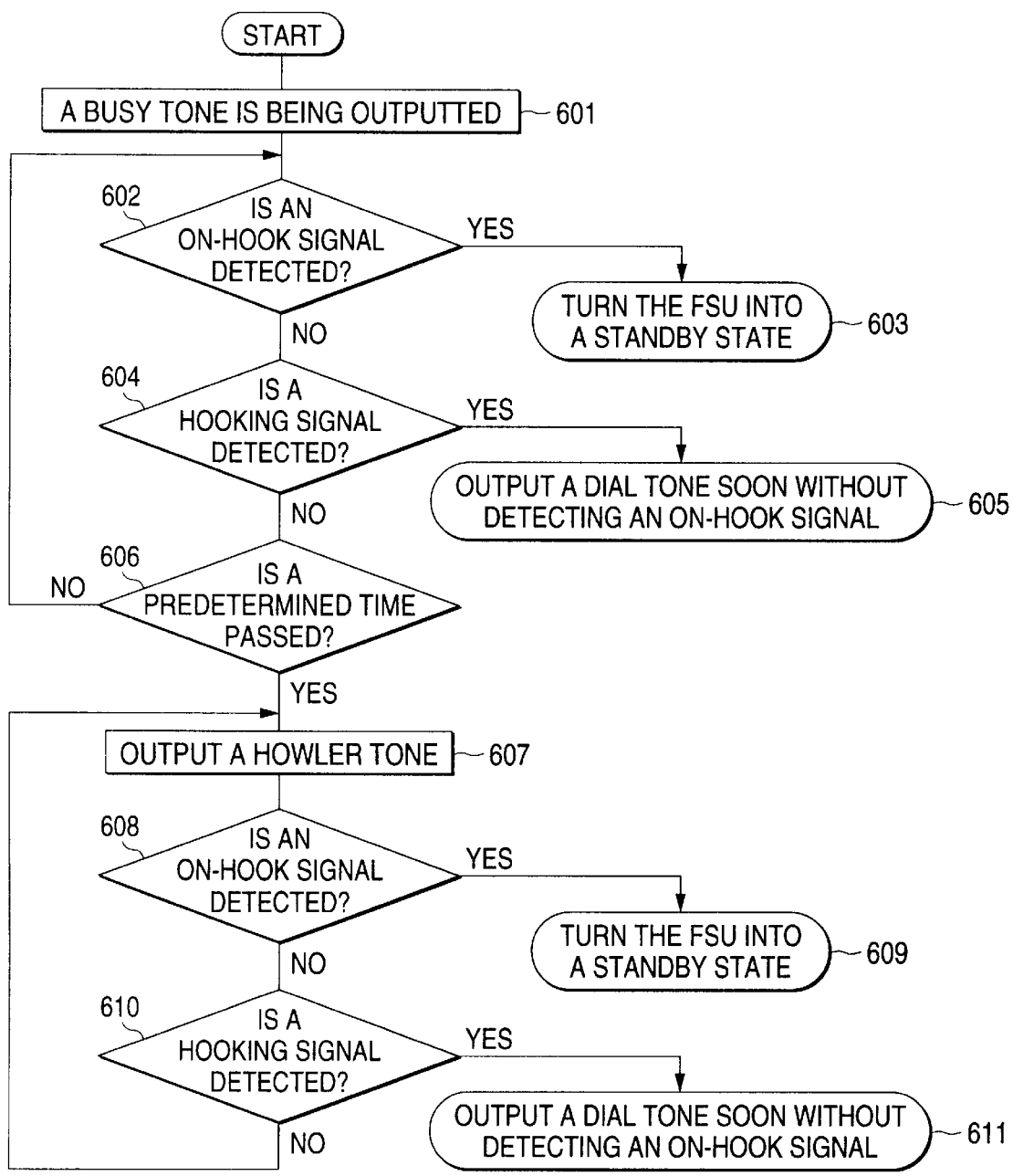
FIG. 6 is a flow chart for explaining the operation of the FSU according to the third embodiment of the present invention.

FIG. 6 is a flow chart for explaining the operation of the FSU according to the third embodiment of the present invention. That is, FIG. 6 is a flow chart for explaining the operation in which the FSU outputs a dial tone to the telephone to turn the telephone to a dial waiting state when a hooking signal from the telephone is detected in the middle of outputting of a busy tone or a howler tone from the FSU to the telephone. The control portion 505 of the FSU depicted in FIG. 5 performs control shown in this flow chart. The operation will be described with reference to this flow chart of FIG. 6 and the circuit diagram of FIG. 5.

When a state in which there is no dial input is continued in the off-hook state of the telephone so that the dial detection timer 505d of the control portion 505 expires, a busy tone is outputted from the tone generating circuit 507f of the telephone line interface portion 507 to the telephone under the control by the busy tone output control means 505e of the control portion 505 in the FSU. FIG. 6 is started from this state (step 601).

If an on-hook signal from the telephone is detected by the telephone off-hook/on-hook signal discriminating means 505a of the control portion 505 through the telephone off-hook/on-hook detecting circuit 507d in the FSU, the FSU gets in a standby state under the control by the control portion 505 (steps 602 and 603).

If a hooking signal instead of the on-hook signal is detected by the telephone off-hook/on-hook signal discriminating means 505a of the control portion 505 through the telephone off-hook/on-hook detecting circuit 507d in the FSU, the control portion 505 in the FSU does not regard the hooking signal as a dial pulse signal and the second dial initializing means 505c performs control so that a dial tone is outputted from the tone generating circuit 507f of the telephone line interface portion 507 to the telephone to turn the FSU into a dial input waiting state (steps 604 and 605).

Incidentally, in the case where a state in which a busy tone is outputted is continued for a predetermined time, a howler tone is outputted from the tone generating circuit 507f to the telephone by the howler tone output control means 505g to thereby inform the user of the continuation of the off-hook state of the telephone when the busy tone output continuation timer 505f in the FSU expires (steps 606 and 607). The operation at the time of the detection of an on-hook signal (steps 608 and 609) and the operation at the time of the detection of a hooking signal (steps 610 and 611) after the outputting of a howler tone are the same as the operation at the time of the detection of an off-hook signal in the middle of the outputting of a busy tone and the operation at the time of the detection of a hooking signal in the middle of the outputting of a busy tone, respectively.

By the operation as described above, the FSU outputs a dial tone to the telephone to turn the telephone into a dial input waiting state when a hooking signal is inputted from the telephone in the middle of the outputting of a busy tone or a howler tone to the from the FSU to the telephone.

Fourth Embodiment

A fourth embodiment of the present invention concerns a fixed subscriber unit in which one digit of pulse dial is converted into a hooking signal when a pulse dial type telephone is connected to the fixed subscriber unit and the dial of the telephone is pushed down carelessly in the middle of speech.

Figure 7:
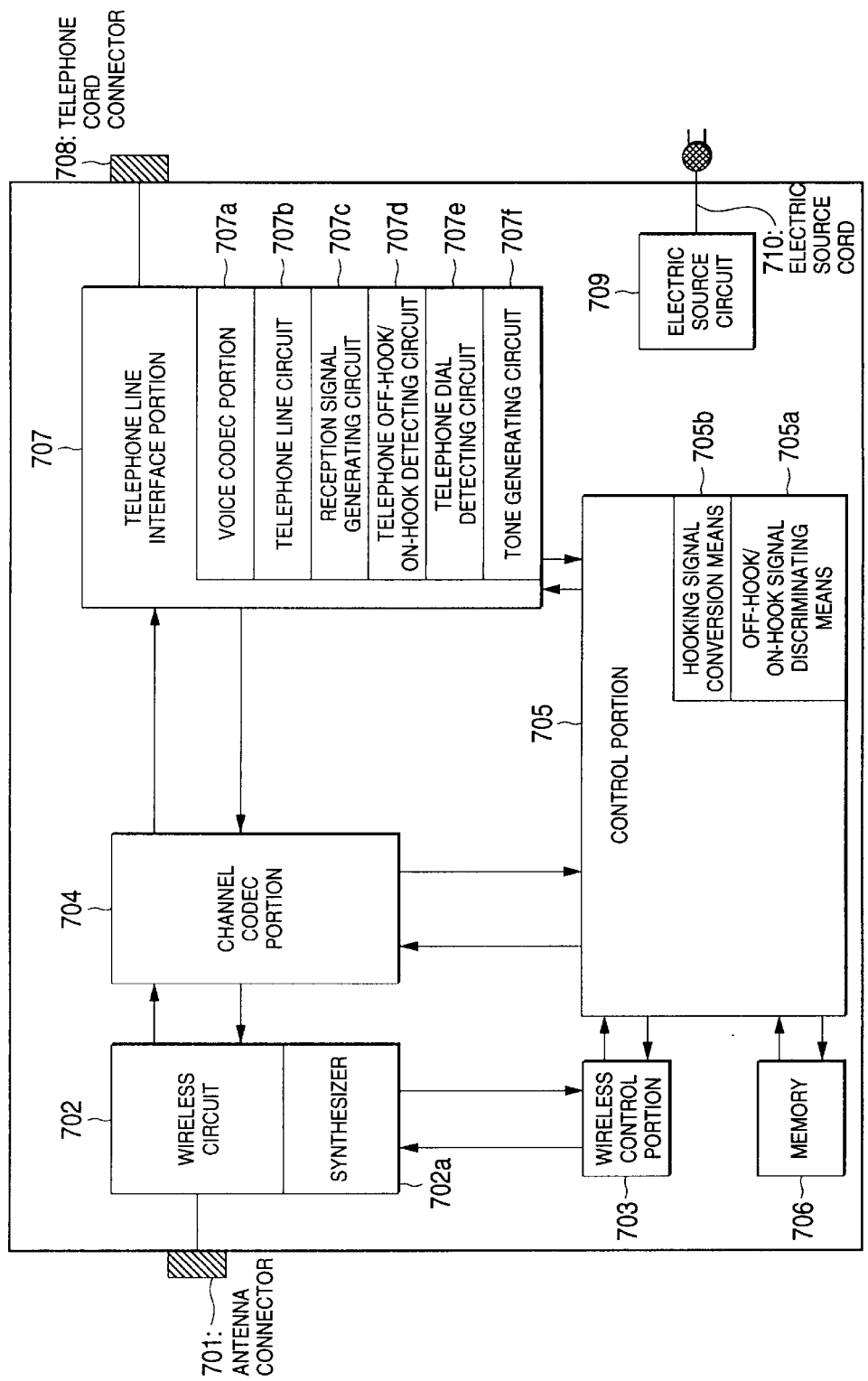
FIG. 7 is a schematic block diagram of the FSU according to a fourth embodiment of the present invention.

FIG. 7 is a block diagram showing the configuration of the fixed subscriber unit (FSU) according to the fourth embodiment of the present invention. In FIG. 7, the reference numeral 701 designates an antenna connector. Because an antenna of the FSU is generally set outdoor, the antenna connector 701 is a connector for connecting a cable of the outdoor antenna. The reference numeral 702 designates a wireless circuit. The wireless circuit 702 transmits/receives wireless data while the frequency and the transmission/reception timing are designated by a wireless control portion 703. The reference numeral 702a designates a synthesizer built in the wireless circuit 702. The synthesizer 702a generates a signal of the frequency designated by the wireless control portion 703. The wireless control portion 703 measures the level of reception on the basis of the wireless data received from the base station and then writes reception level data in a temporary storage memory in a control portion 705.

The reference numeral 704 designates a channel codec portion for coupling/decoupling data transmitted/received through a wireless control channel and a communication channel. A data in a communication channel is composed of information such as voice data, or the like, and control information to be processed by the control portion 705. The user data such as voice data, or the like, is signal-processed by voice codec in a telephone line interface portion without any interposition of the control portion 705. The reference numeral 705a designates an off-hook/on-hook signal discriminating means; and 705b, a hooking signal conversion means. The reference numeral 706 designates a memory. The reference numeral 707 designates a telephone line interface portion; 707a, a voice codec portion; 707b, a telephone line circuit; 707c, a reception signal generating circuit; 707d, a telephone off-hook/on-hook detecting circuit; 707e, a telephone dial detecting circuit; and 707f, a tone generating circuit. The reference numeral 708 designates a telephone cord connector for connecting a telephone cord of the telephone connected to the FSU; 709, an electric source circuit; and 710, an electric-source cord.

Figure 8:
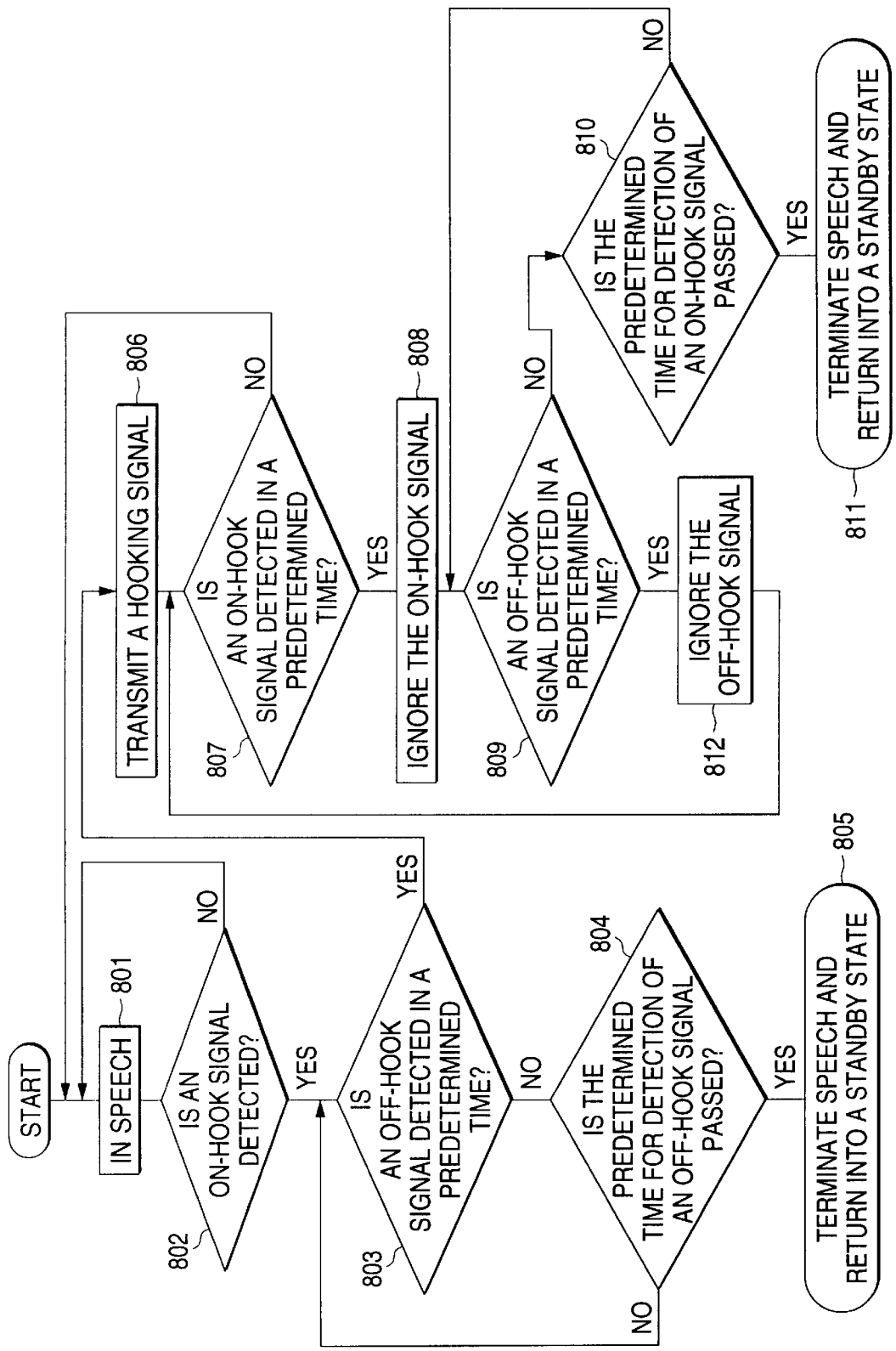
FIG. 8 is a flow chart for explaining the operation of the FSU according to the fourth embodiment of the present invention.
Figure 9:
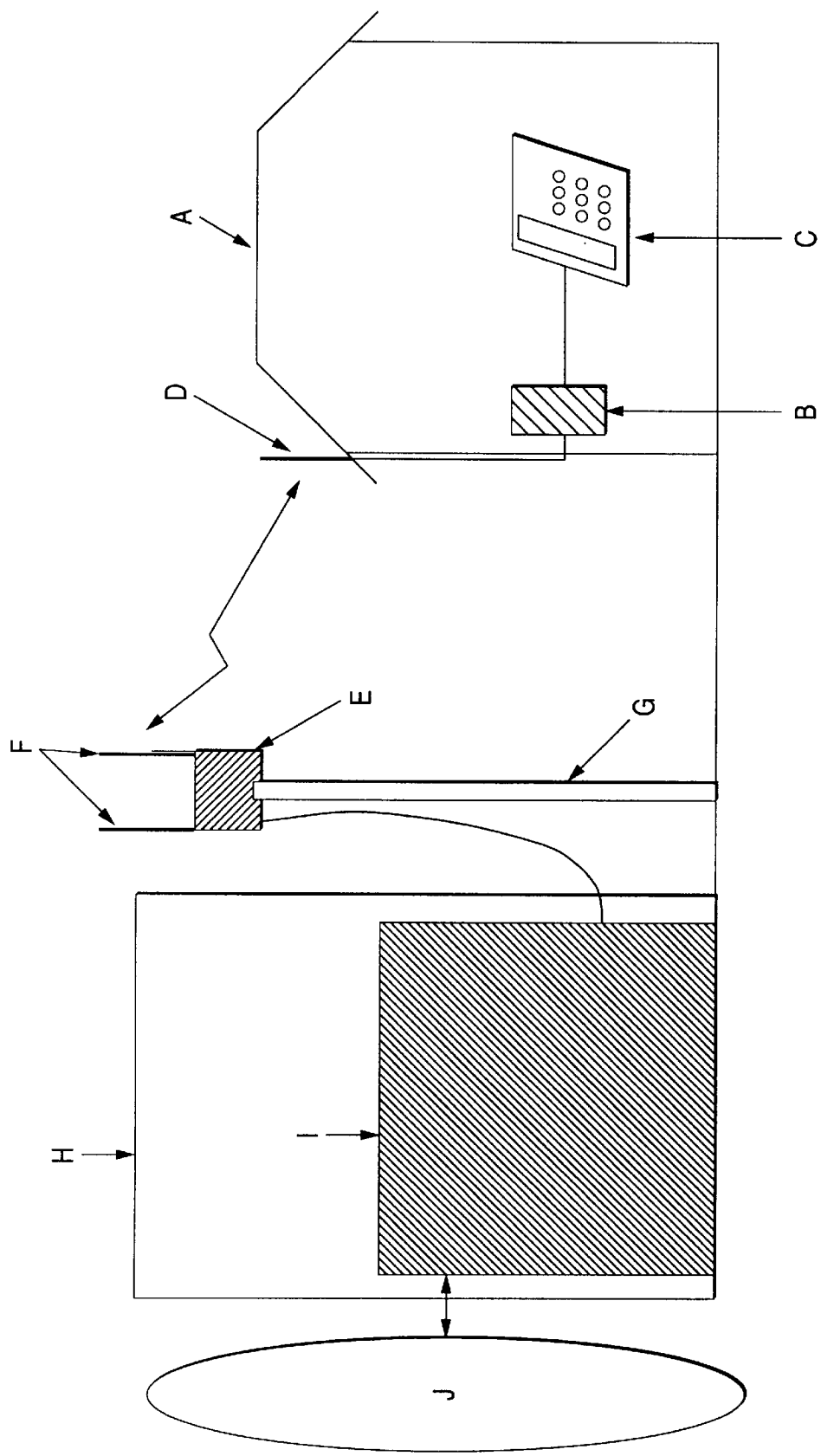
FIG. 9 is an overall configuration diagram of a wireless local loop (WLL) system.
Figure 10:
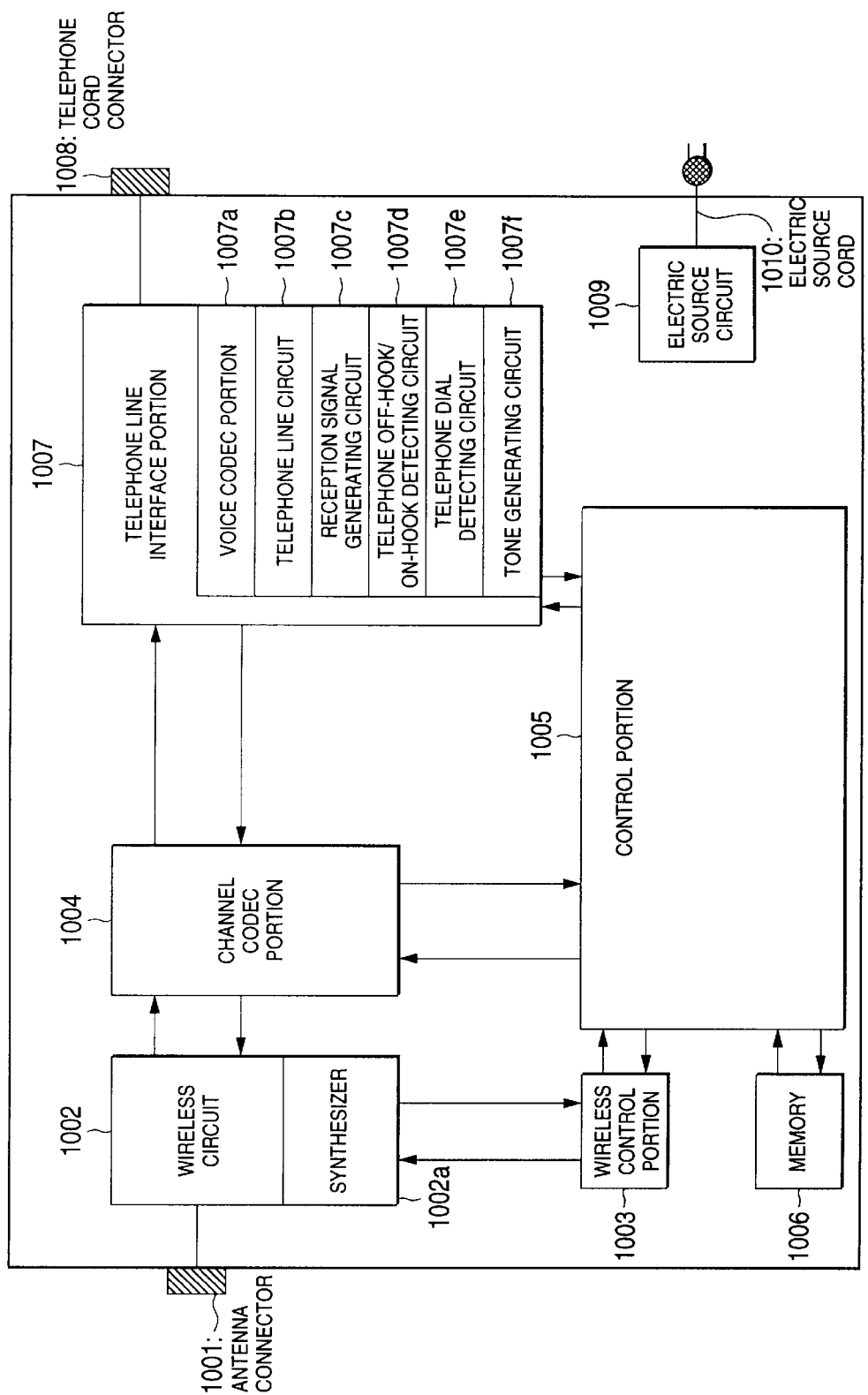
FIG. 10 is a schematic block diagram of a conventional FSU.
Figure 12:
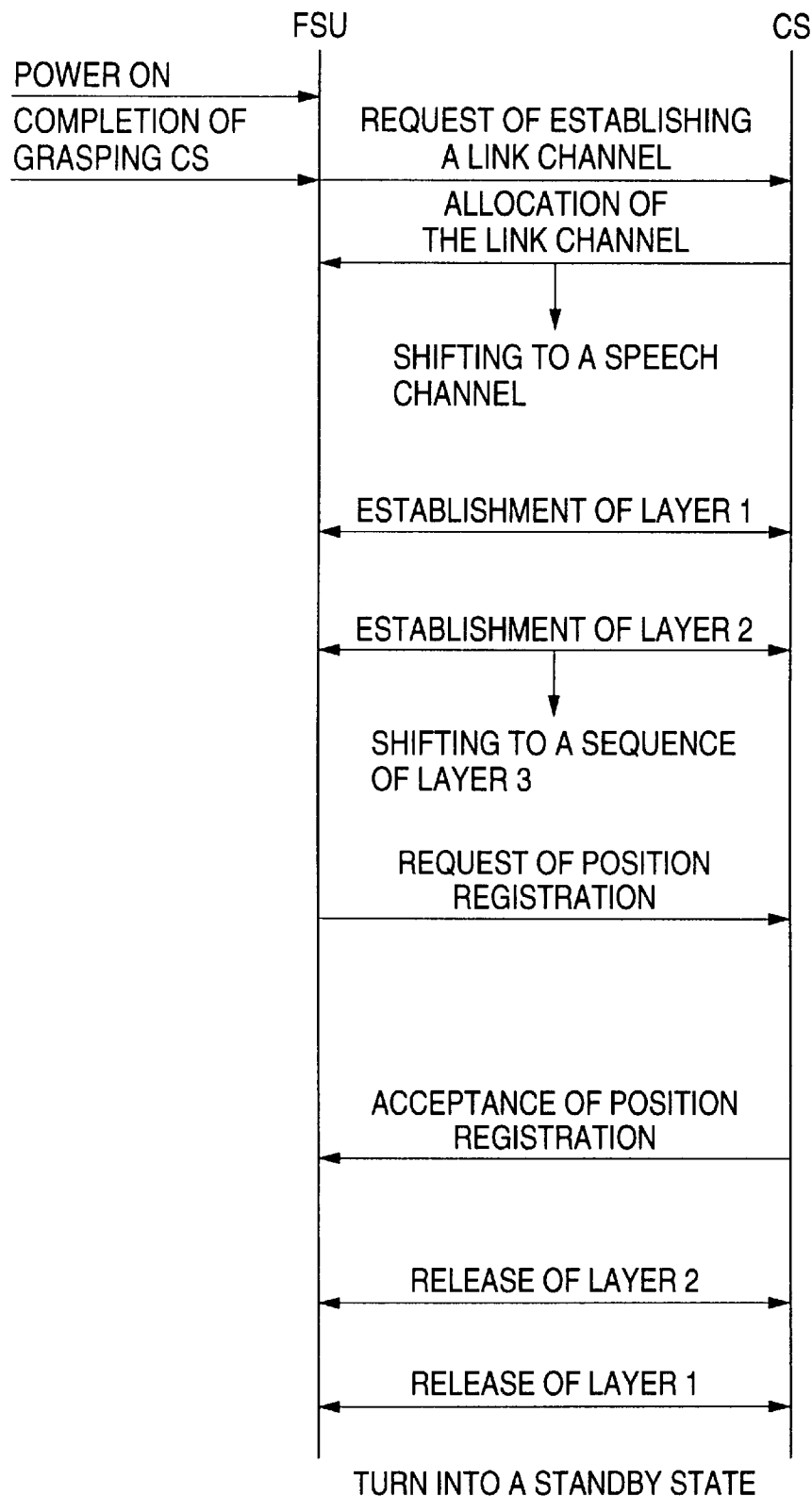
FIG. 12 is a schematic diagram of a sequence of position registration from FSU to CS in a WLL system.
Figure 13:
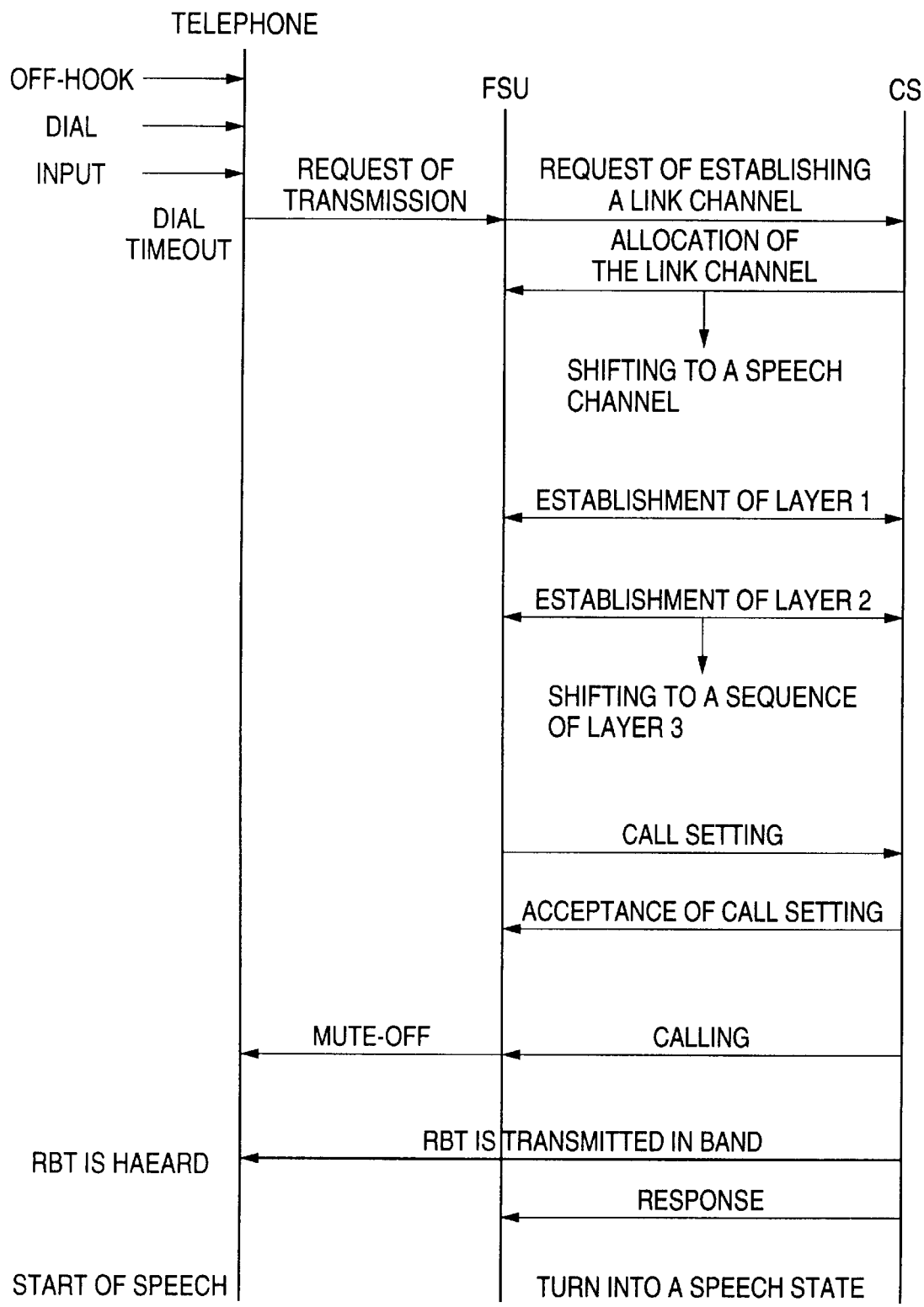
FIG. 13 is a schematic diagram of a sequence of batch transmission from FSU to CS in a WLL system.
Figure 14:
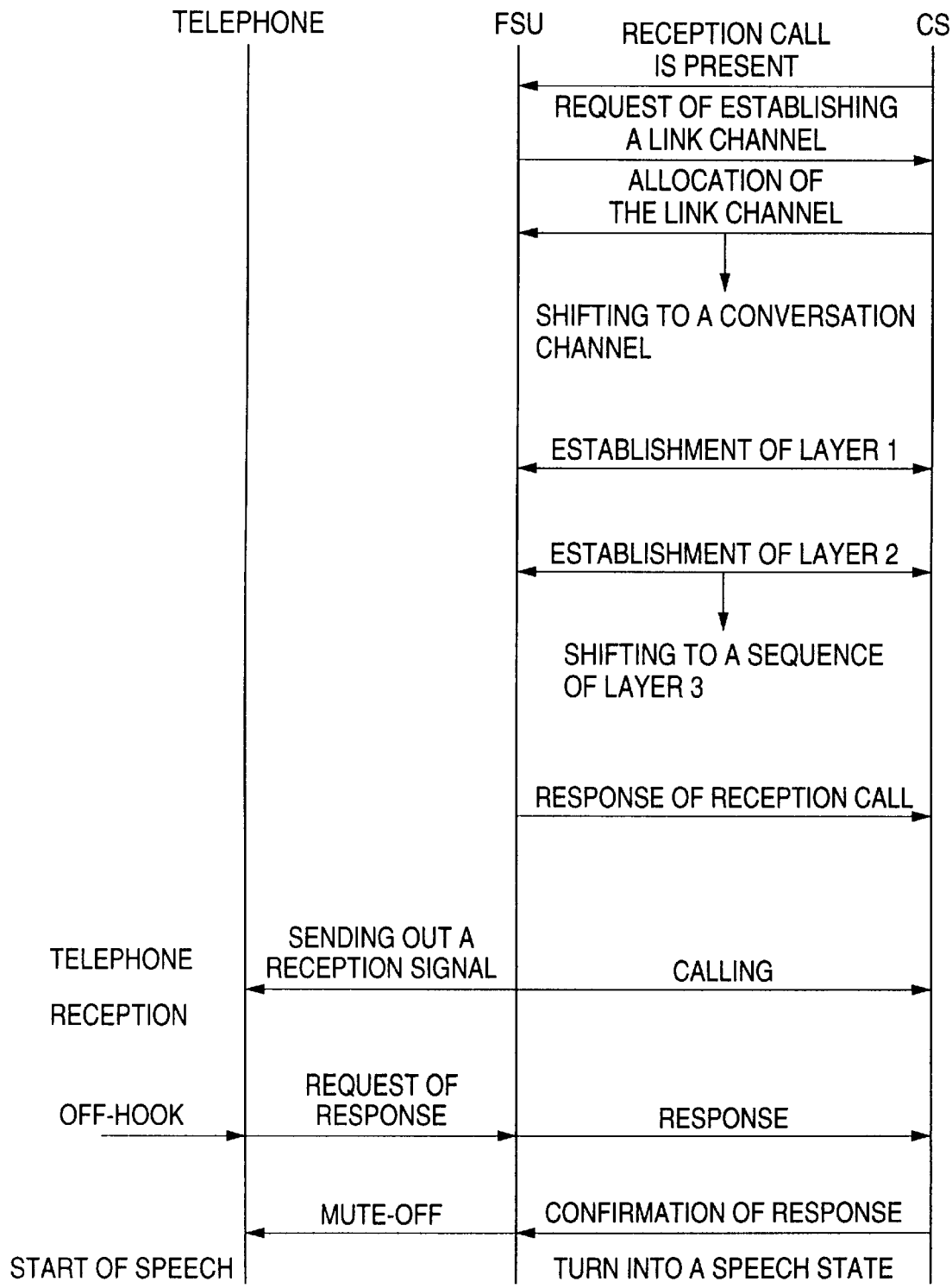
FIG. 14 is a schematic diagram of a sequence of reception from CS to FSU in a WLL system.

FIG. 8 is a flow chart for explaining the operation of the FSU according to the fourth embodiment of the present invention. That is, FIG. 8 is a flow chart for explaining the operation in which each of pulse dials of from "0" to "9" is converted into one hooking signal when a pulse dial signal from the telephone is inputted to the FSU in the middle of speech. The control portion 705 of the FSU depicted in FIG. 7 performs control shown in this flow chart. The operation will be described with reference to this flow chart of FIG. 8 and the circuit diagram of FIG. 7.

FIG. 8 shows a flow chart explaining the operation after the telephone has gotten in a conversation state (step 801). When an off-hook signal is detected in a predetermined time (step 803) after an on-hook signal is detected in the middle of speech (step 802), a hooking signal is transmitted (step 806). When an on-hook signal is detected in a predetermined time after that (step 807), the FSU recognizes that the pulse dial is pushed down carelessly and the FSU ignores the on-hook signal (step 808). When an off-hook signal is detected in a predetermined time after that, the FSU ignores also the off-hook signal (steps 809, 812 and 807). When there is no on-hook signal detected in a predetermined time after that, the FSU decides that the pulse dial is terminated and makes the telephone return into an ordinary speech state (steps 807 and 801). When the predetermined time for the on-hook state is passed, speech is terminated and the telephone is returned into a standby state (steps 810 and 811).

By the aforementioned operation, a hooking signal can be extremely prevented from being transmitted even in the case where the dial of a pulse dial type telephone is pushed down carelessly in the middle of speech.

As is obvious from the aforementioned embodiments, the present invention is configured so that an off-hook/on-hook signal discriminating means is provided in the control portion of the FSU to make discrimination between a pulse dial signal and a hooking signal. Accordingly, there arises an effect that dialing and hooking can be used differently in the same operation as an ordinary telephone connected to a wire telephone line.

Further, when a hooking signal from the telephone is detected in the middle of dial inputting through the telephone or in the middle of busy tone or howler tone outputted from the telephone, a dial tone is outputted to the telephone to return the telephone into a dial input waiting state. Accordingly, there arises an effect that the user can perform dial inputting immediately after hooking.

In addition, when a pulse dial type telephone is connected to the FSU and the dial of the telephone is pushed down carelessly in the middle of speech, one digit of pulse dial is converted into one hooking signal. Accordingly, there arises an effect that the hooking signal can be extremely prevented from being transmitted.

What is claimed is:

1. A fixed subscriber unit of a wireless local loop system comprising:

a wireless circuit for making a wireless connection to a base station connected to a telephone line network;

a wireless control portion;

a channel codec portion;

a memory;

a control portion including an off-hook/on-hook signal discriminating means which has a guard timer for discriminating between a hooking signal and a pulse dial signal; and a telephone line interface portion for connecting a telephone, said telephone line interface portion including a telephone off-hook/on-hook detecting circuit, a telephone dial detecting circuit, and a tone generating circuit.

2. A fixed subscriber unit as claimed in claim 1, wherein said control portion includes a dial initializing means for controlling said tone generating circuit to generate a dial tone in response to said hooking signal detected by said off-hook/on-hook signal discriminating means during detection of said dial signal by said telephone dial detecting circuit.

3. A fixed subscriber unit as claimed in claim 1, wherein said control portion includes a dial detection timer for performing waiting a predetermined time for dial detection after off-hook, a busy tone output control means for performing control to output a busy tone through said tone generating circuit when said dial detection timer expires, a busy tone output continuation timer, and a howler tone output control means for performing control to output a howler tone when said busy tone output continuation timer expires.

4. A fixed subscriber unit as claimed in claim 2, wherein said control portion includes a dial detection timer for performing waiting a predetermined time for dial detection after off-hook, a busy tone output control means for performing control to output a busy tone through said tone generating circuit when said dial detection timer expires, a busy tone output continuation timer, and a howler tone output control means for performing control to output a howler tone when said busy tone output continuation timer expires.

5. A fixed subscriber unit as claimed in claim 1, wherein said control portion includes a second dial initializing means for performing control to stop said busy tone or said howler tone and generate a dial tone in response to said hooking signal or said pulse dial signal detected by said off-hook/on-hook signal discriminating means in the middle of the busy tone or howler tone output.

6. A fixed subscriber unit as claimed in claim 2, wherein said control portion includes a second dial initializing means for performing control to stop said busy tone or said howler tone and generate a dial tone in response to said hooking signal or said pulse dial signal detected by said off-hook/on-hook signal discriminating means in the middle of the busy tone or howler tone output.

7. A fixed subscriber unit as claimed in claim 3, wherein said control portion includes a second dial initializing means for performing control to stop said busy tone or said howler tone and generate a dial tone in response to said hooking signal or said pulse dial signal detected by said off-hook/on-hook signal discriminating means in the middle of the busy tone or howler tone output.

8. A fixed subscriber unit as claimed in claim 2, wherein said control portion includes a hooking signal conversion means for converting each of pulse dial signals of from "0" to "9" into one hooking signal in response to said pulse dial signal detected by said off-hook/on-hook signal discriminating means in a speech state.

\* \* \* \* \*